United States Patent [19]

Hancock et al.

[11] 4,399,602
[45] Aug. 23, 1983

[54] CABLE END CAP REMOVAL METHOD

[75] Inventors: David S. Hancock, Roswell; James R. Holman, Lilburn, both of Ga.

[73] Assignee: Western Electric Company, Inc., New York, N.Y.

[21] Appl. No.: 287,619

[22] Filed: Jul. 28, 1981

[51] Int. Cl.³ .............................................. B23P 19/00
[52] U.S. Cl. .................................... 29/426.4; 206/616; 206/329; 53/492; 53/412; 29/235; 174/74 A; 174/10; 83/200.1; 83/651.1
[58] Field of Search ...................... 29/857, 859, 426.4, 29/235; 83/200.1, 651.1; 174/74 A, 93, 10, 19; 53/492, 397, 412; 206/616, 617, 618, 619, 329

[56] References Cited

U.S. PATENT DOCUMENTS

| 1,969,764 | 8/1934 | Soutter | 174/10 |
| 2,771,872 | 11/1956 | Bergling | 83/651.1 |
| 3,748,371 | 7/1973 | Krook et al. | 174/70 R |
| 4,029,895 | 6/1977 | Scarborough | 174/138 F |
| 4,237,337 | 12/1980 | Serrander | 174/70 R |
| 4,300,328 | 11/1981 | Carlsen | 174/74 A |

Primary Examiner—Lowell A. Larson
Assistant Examiner—David B. Jones
Attorney, Agent, or Firm—David P. Kelley

[57] ABSTRACT

A method is disclosed for removing an end cap from a telecommunications cable wherein a circumferential incision and a plurality of longitudinal incisions are made with a wire in segmenting the cap.

5 Claims, 10 Drawing Figures

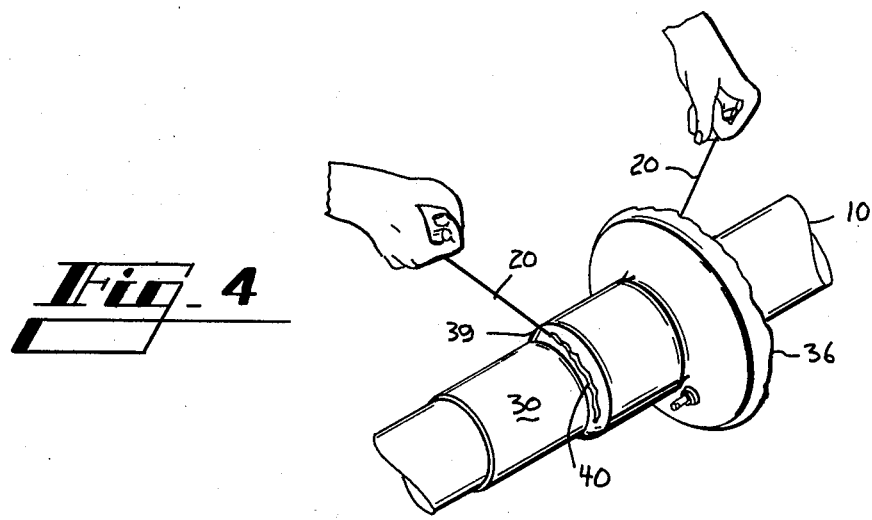
Fig_4
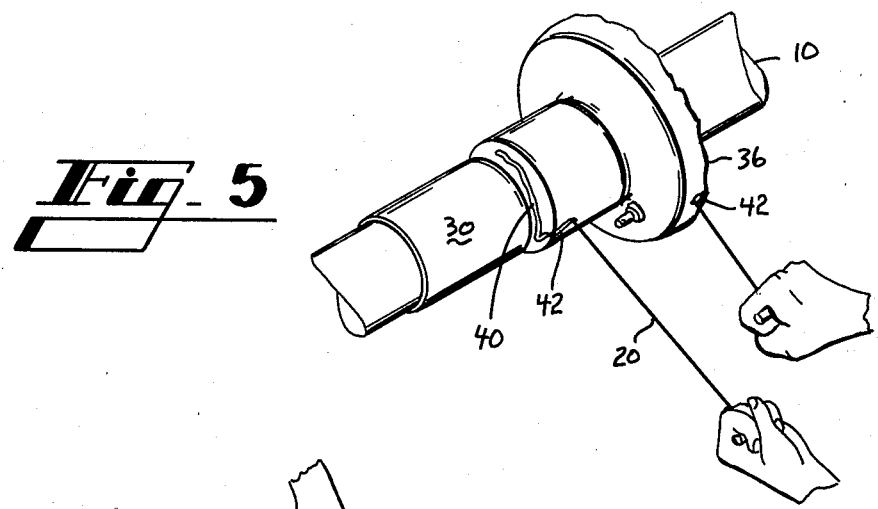
Fig_5
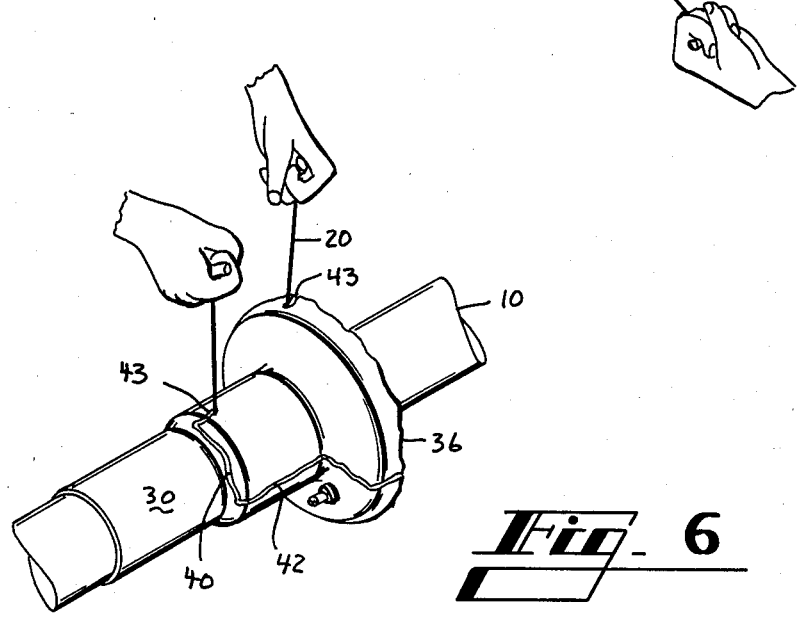
Fig_6

4,399,602

CABLE END CAP REMOVAL METHOD

TECHNICAL FIELD

This invention relates generally to telecommunication cable end seals, and particularly to methods of removing end cap type end seals from about preconnectorized telecommunication cable ends.

BACKGROUND OF THE INVENTION

In order that moisture be prevented from entering and damaging a telecommunication cable the cable ends are typically sealed temporarily prior to their being interconnected or terminated in the field. For years this has been done with cylindrical, heat shrinkable type end caps heat shrunk into sealing contact with the cable jacket about the cable ends. To remove this type of end cap an operator merely severed the cable at a location adjacent the end cap and discarded the cap and cable end segment located within.

Recently, telecommunication cables have been "preconnectorized" at the cable manufacturing plant in order to facilitate field connectorization. This entails attaching the end of each cable wire at the factory to a metallic connector, arranging the various connectors into one or more groups, and then bagging the groups into a bundle. Since the bundle of connectors occupies a space diametrically greater than that of the cable itself, the end portion of an end cap encasing the bundle has had to be made wider than that portion sealed to the cable jacket. As such reconfigured end caps can no longer be removed by merely severing the cable, since this would also cut off the bundle of connectors, new end cap removable methods have had to be devised.

One of the first end seals developed for pressurized, preconnectorized cables was a polyethylene bag with foam. The bag was taped to the cable while the foam layer inside the bag provided mechanical protection and was, at best, unreliable. Another early end seal for pressurized, preconnectorized cables was that known as the "Boot and Bag" which comprises a rubber boot placed about the connectors with a tapered boot neck taped tightly to the cable jacket. The boot is overlayed with a fabric cover which also is taped tightly to the cable jacket in order to support the rubber boot. This type of end seal has had to withstand pressure forces that tend to propel the bag off of the end of the cable. Although it is not believed that a boot and bag have ever been propelled from a cable end they nevertheless have possessed this potential and have also had a tendency to be leaky.

The next end seal developed for preconnectorized telecommunication cables was that termed the "One Piece" type end cap. This end cap, which is made of high density polyethylene plastic, is bottle-shaped and has its neck crosslinked and irradiated so as to be heat shrinkable. Once it is placed about the cable bundle heat is applied to its neck causing it to shrink down upon an adhesively coated section of the cable jacket adjacent the bundle. Unfortunately, the One Piece type end cap has proved to be quite costly, difficult and potentially dangerous to remove as by the use of embedded rip wires and heating torches.

Most recently a "Two Piece" end cap, also composed of high density plastic, has been developed for pressurized, preconnectorized telecommunication cables. This end cap, which also has an overall bottle-shaped appearance, has a cup-shaped, closed end section which is placed over the connector bundle and threadedly secured to an open ended, reducer section that is placed about the cable prior to formation of the cable bundle. The reducer section itself has a relatively narrow open neck end that closely overlays the cable jacket and is sealed thereto by means of heat shrinkable tubing shrunk down upon the open neck end and that portion of the cable jacket extending out from it. The reducer section also has a relatively wide shoulder end sized to be threaded into the cup-shaped, closed end section of the end cap. A thermo-compression seal is made over the threaded junction of the two sections.

As previously mentioned end caps of all types must be removed from the cable ends of connectorization. Again, with earlier cables that were not preconnectorized the cable was merely severed at a point next to the heat shrunk cap, the cable wire ends stripped of insulation and the connections made. With the Boot and Bag type end seal the fabric cover and rubber boot was tediously cut away as with a knife. With the One Piece end cap a rip wire was seated between the adhesive coated cable jacket and end cap neck. During its removal the rip wire would be coiled in cutting through the neck portion, in the familiar sardine can opening fashion, to a circumferential incision in the larger portion of the cap made with a saw. This latter procedure was particularly slow and tedious to perform in the field.

With the newer Two Piece type end cap the embedded rip wire approach cannot be practically used due to the absence of adhesive between the cap and cable jacket through which the wires would have to pass in a sealed, leak free fashion. Here it is necessary to remove not only the cup-shaped, open end section but also the reducer section since without its removal it would be very difficult to mount the cable end into a splice case or to route it to a pedestal type terminating block. In order that this type end cap may be removed, a circumferential cut has been made in the cap about that portion of the cable wires fanning out from the cable jacket towards the connector bundle. The cup-shaped, closed end section was then manually removed. Next a second, conical incision was made in the end cap closely adjacent the point at which the end cap curves inwardly to the narrow neck end placed closely about the cable jacket. Though at this point the end cap does not protrude very far away from the cable jacket it does necessitate the incurrence of risk that the cutting action may damage the cable itself. This danger is enhanced by the fact that such a cut is at an awkward angle for it to be made manually, being oriented generally parallel with the cable jacket and towards the cable bundle. Inherent with this also is the risk of damage being made to the connectors themselves in view of the difficulty of forming an incision in the oddly shaped reducer section.

SUMMARY OF THE INVENTION

In a preferred form of the invention a method is provided for removing an end cap from a telecommunications cable with the end cap having a closed end portion encasing a bundle of connectors affixed to wire ends of the cable and being sealed to the cable jacket by a tubular seal overlaying an open end portion of the end cap through which the cable extends from the connector bundle. The method comprises the steps of severing the end cap closed end from the end cap open end and removing the closed end from about the cable bundle. A hole is formed in the tubular seal closely adjacent the end cap open end. A wire is inserted through the seal hole and between the cable jacket and end cap open end. A circumferential incision is formed with the wire in the tubular seal. A plurality of circumferentially spaced longitudinal incisions are also formed with the wire in the end cap open end extending from the circumferential incision in the seal thereby separating the end cap open end into a plurality of circumferential segments which are then removed from about the cable.

BRIEF DESCRIPTION OF THE DRAWING

FIGS. 4, 5 and 6 are each perspective views of the cable and end cap segment shown in FIGS. 2 and 3 being cut in a sequence of steps in accordance of principles of the present invention;

DETAILED DESCRIPTION

Figure 1:
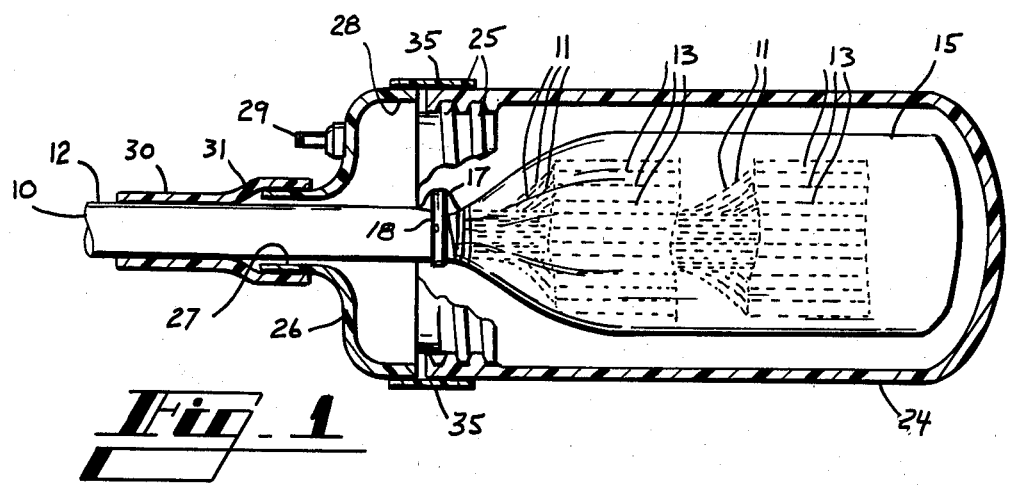
FIG. 1 is a side elevational view, in cross-section, of a Two Piece type telecommunications end cap shown mounted to the end of a preconnectorized cable.
Figure 2:
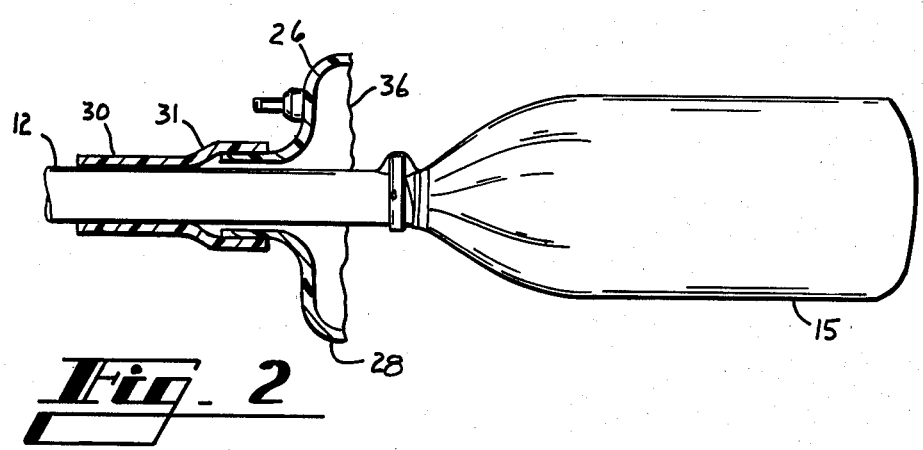
FIG. 2 is a side elevational view of the cable end cap shown in FIG. 1 following removal of a closed end section of the end cap from about a cable connector bundle.

Referring now in more detail to the drawing, there is shown in FIG. 1 a telecommunications cable 10 having a plurality of insulated wires 11 within a plastic jacket 12. To the ends of the insulated wires are attached metallic connectors 13 here organized into two groups enclosed in a bag 15 secured to an end of the cable jacket 12. The bag 15 and the connectors and wire ends enclosed therein are collectively referred to as the "bundle". A smaller plastic bag 17 is also seen to be mounted about an end of the jacket 12 adjacent the bundle by a means of tape 18. Within the smaller bag 17 is located a multistranded wire 20 and two handles 21 as shown unbagged and in use in FIGS. 3-6.

With continued reference to FIG. 1 a Two Piece end cap is shown mounted to the telecommunications cable 10 comprised of a high density polyethylene, cup-shaped closed end section 24 that does have one open end formed with female threads into which male threads 25 of a high density polyethylene end cap open end or reducer section 26 are threaded. The reducer section 26, to which a pressurization valve 29 is mounted, is placed loosely about the end of the cable jacket 12 prior to affixation of the connectors 13 and the formation of the bundle. A small, open end neck 27 of the reducer section is sized to fit closely about but slightly from the surface of the cable jacket 12 while its other relatively large shoulder end 28 has an outside diameter approximating that of the end cap closed end section 24.

The neck 27 of the reducer section 26 is hermetically sealed to the cable jacket 12 by heat shrink tubing 30. One end of the tubing 30 is heat shrunk down directly upon the cable jacket 12 while its other end is heat shrunk down upon the small end 27 of the reducer section. Since the outer surface of neck 27 has a diameter greater than that of the cable jacket 12 the tubing 30, upon being heat shrunk, has a span portion 31 connecting that portion of the tubing heat shrunk down upon the jacket and that portion heat shrunk down upon the reducer section. This spanning portion angles away from the surface of the cable jacket to leave a small gap between it and the jacket. A high density plastic strip 35 is placed about the threaded juncture of the end cap closed end and reducer sections and then fused by a thermo-compression process to seal the seam between these two parts.

In removing the end cap in accordance with the present inventive method the end cap closed end section 24 is first severed from the end cap open end section and then slid off from its position about the bundle. This is preferably done by the operator taking a saw and making a circumferential incision in the end cap aside the fused high density polyethylene strip 35 to form the irregular surface 36 shown in FIGS. 2-6. In doing this there is little risk of the saw contacting the cable since the reducer shoulder 28 is spaced relatively far from the cable and connector bundle. As just stated this cut is made in the end cap reducer section 26 adjacent the polyethylene strip rather than through it in order to facilitate the cutting action. However, it should be understood that the cut could be made through the tubular seal itself. Furthermore, the incision could be made through a portion of the closed end section 24 adjacent the strip 35 though such is obviously not recommended due to the added thickness of the material present in this area where the closed end section overlaps the reducer section. The point is here made, however, that the severing of the end cap closed end from the reducer section is intended to be in general terms and not limited to a severing of an entire closed end component from the entire open end or reducer component.

Next, the small bag 17 is removed from about the cable jacket, opened, and the wire 20 and handles 21 removed. A small hole 39 is made in the span portion 31 of the tubing 30 and the wire 20 inserted through the hole and passed between the cable jacket 12 and the neck 27 of the end cap reducer section 26. The other handle is then attached to the wire as shown in FIG. 3.

Figure 3:
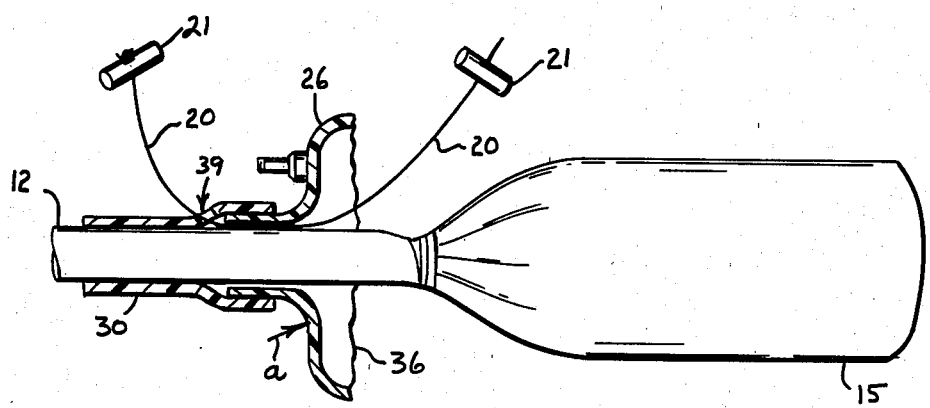
FIG. 3 is the same as FIG. 2 following the formation of a hole in a tubular seal and the insertion of a multistranded wire through the hole and between the end cap and cable jacket.
Figure 7:
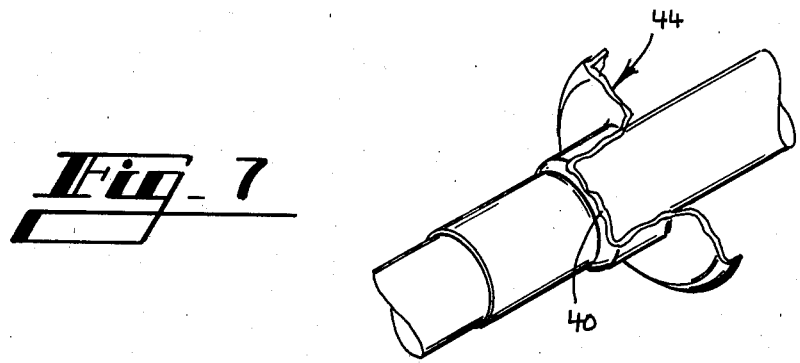
FIG. 7 is a perspective view of the cable end and end cap segment shown in FIGS. 2 and 3 after a segment has been cut away and removed following the cutting steps illustrated in FIGS. 4-6.

With the wire now in the position shown in FIG. 3 a sawing motion is made by the operator to form a circumferential incision 40 in the span portion 39 of the tubular seal as illustrated in FIG. 4. Next, a longitudinal cut 42 is made as illustrated in FIG. 5 by a sawing motion with radially directed force. After the longitudinal cut 42 has been formed another longitudinal cut 43 is made circumferentially spaced from the cut 42 as shown in FIG. 6. Once both longitudinal cuts have been made a segment of the end cap reducer section, together with a bit of the tubular seal, is severed from its remainder 44 as shown in FIG. 7. Following this action the circumferential incision 40 is expanded by a cutting motion of the wire completely about the cable jacket. Preferably, one additional longitudinal cut is then made, circumferentially spaced from the two others, whereupon the remainder 44 is again segmented into two additional parts which may easily be removed from about the cable. The attaching heat shrink tubing 30 can be cut from the remainder 44 as with a pair of scissors.

Figure 8:
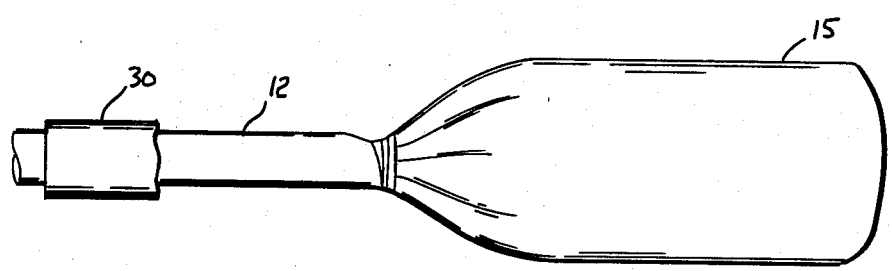
FIG. 8 is a side elevational view of a cable end following complete removal of the end cap in accordance with the operations depicted in FIGS. 2-7 and additional steps.

From FIG. 7 and the procedure just described it is apparent that approximately three arcuate segments of 120° radius each are formed for easy removal. However, only two sections need be made since each could then be removed in radially opposite directions from about the cable jacket. And, of course, more than three segments could be formed. After removal of the end cap the cable end appears as illustrated in FIG. 8 with merely a portion of the heat shrinkable tubing 30 remaining on the cable jacket 12. The connectors within the bundle 15 may now be debagged and connections made to another cable end or to a terminating block. Where the connectors are coupled to another cable a splice case will normally be placed about the cable connector area. With the end cap removed this may be done without structural interference.

Figure 9:
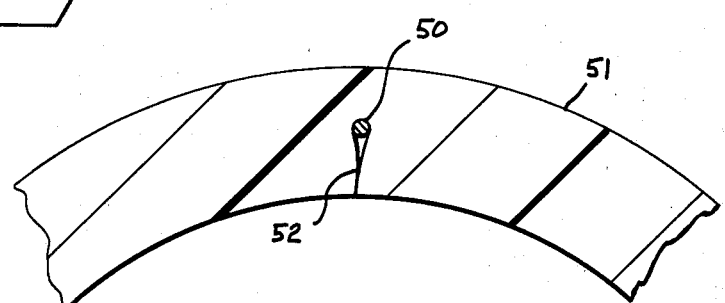
FIG. 9 is a cross-sectional view of the fragment of a cable end cap shown in FIG. 1 being cut with a monofilament wire.
Figure 10:
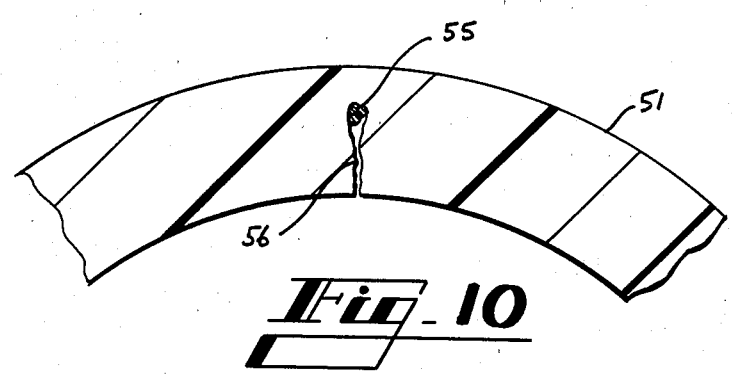
FIG. 10 is a fragmentary view of a fragment of the end cap shown in FIG. 1 being cut with a multifilament wire.

As previously mentioned it is preferable that a multifilament wire be used to effect the cutting actions of the procedure. The reason for this may be visualized by reference to FIGS. 9 and 10. In FIG. 9 a monofilament wire 50 is seen to have been sawed partly through a plastic end cap wall 51. Note however that a portion 52 of the seam so formed has come back into flush self engagement following passage of the wire. Due to the significant amount of heat generated by the sawing action of the wire the plastic may then fuse back together and reseal. For this reason it is recommended that a multifilament wire 55 be employed as shown in FIG. 10 whereby the seam 56 formed from its cutting action is jagged and less likely to fuse and self seal.

In the just described method the same wire has been used throughout the several cutting operations. However, it should be understood that though this is obviously the most expeditious way of forming the cuts, that other wires could be substituted between steps if so desired. Though the circumferential incision 40 is made but partially around the cable at the time the second longitudinal cut 43 was made as shown in FIG. 6, it may well be continued completely around the cable prior to the formation of any of the longitudinal cuts. Also, though the hole 39 and circumferential incision 40 are formed in the seal span portion, the hole could be made in the adjacent reducer section where indicated by the arrow a in FIG. 3 and the circumferential incision made from there. Though this alternate is deemed equivalent it is not preferred since the tubular seal material is much thinner and easier to cut. That the method has been illustrated being practiced on a Two Piece type end cap it may, of course, be used to remove other types. Other modifications, additions and deletions may also be made without departure from the spirit and scope of the invention as set forth in the following claims.

What is claimed is:

1. A method of removing an end cap from a telecommunications cable of the type wherein the end cap has a closed end portion encasing a bundle of connectors affixed to wire ends of the cable and being sealed to the cable jacket by a tubular seal overlaying an open end portion of the end cap through which the cable extends from the connector bundle, and with the method comprising the steps of:
    (a) severing the end cap closed end from the open end and removing the closed end from about the cable bundle;
    (b) forming a hole in the tubular seal closely adjacent the end cap open end;
    (c) inserting a wire through the tubular seal hole and between the cable jacket and end cap open end;
    (d) forming a circumferential incision with the wire in the tubular seal;
    (e) forming a plurality of circumferentially spaced longitudinal incisions with the wire in the end cap open end extending from the circumferential incision in the seal thereby segmenting the end cap open end into a plurality of circumferential segments; and
    (f) removing the end cap open end segments from about the cable.

2. The end cap removal method of claim 1 wherein the circumferential incision is formed in the tubular seal completely about the cable prior to the formation of the plurality of longitudinal incisions.

3. The end cap removal method of claim 1 further comprising the step of (g) cutting the tubular seal off of the cable jacket.

4. A method of removing an end cap from a telecommunications cable with the end cap having a closed end portion covering a preconnectorized cable end and joined to a open end portion sealed to the cable jacket by a tubular seal overlaying at least part of the end cap open end and the cable jacket extending out of the end cap open end, the tubular seal having an annular span portion located closely adjacent to an end of the end cap open end and spaced from the cable jacket, and with the method comprising the steps of:
    (a) severing the end cap closed end from the end cap open end and removing the end cap closed end from about the preconnectorized cable end;
    (b) forming a hole in the tubular seal span portion;
    (c) inserting a wire through the seal span hole and between the cable jacket and end cap open end;
    (d) sawing with the wire circumferentially through the seal span completely about the cable;
    (e) sawing with the wire radially through the end cap open end at a plurality of circumferentially spaced locations thereby segmenting the end cap open end; and
    (f) removing the end cap open end segments from about the cable.

5. A method of removing an end cap from a telecommunications cable of the type having a closed end portion encasing a bundle of connectors affixed to wire ends of the cable and an open end portion sealed to the cable jacket adjacent to the connector bundle, and with the method comprising the steps of:
    (a) severing the end cap closed end from the sealed end cap open end and removing the closed end from about the cable bundle;
    (b) forming a hole in the end cap open end at a position where the end cap is spaced slightly from the cable;
    (c) inserting a multifilament wire through the hole and between the cable jacket and end cap open end;
    (d) forming with the wire a circumferential incision in the end cap open end about the cable and a plurality of circumferentially spaced incisions in the end cap open end extending from the circumferential incision to segment a portion of the end cap open end; and
    (e) removing the end cap open end segments from about the cable.

* * * * *